United States Patent [19]
Borkent et al.

[11] Patent Number: 5,554,203
[45] Date of Patent: Sep. 10, 1996

[54] FILTER ELEMENT

[76] Inventors: Albert Borkent, 2 Prins Bernhardweg, NL 8453, XB Oranjewoud; Erik Kuiper, 30 Wiidswal, NL 8465 PV, Oudehaske; Sander G. Van Vreeland, 133 Bögelskamphoek, NL 7546, DJ Enschede, all of Netherlands

[21] Appl. No.: 372,471

[22] Filed: Jan. 13, 1995

[51] Int. Cl.6 .................................................. B01D 46/00
[52] U.S. Cl. .............................. 55/378; 55/483; 55/484; 55/499; 55/DIG. 12
[58] Field of Search .......................... 55/378, 381, 483, 55/484, 499, 500, DIG. 12, DIG. 31; 70/57.1, 276; 292/251.5

[56] References Cited

U.S. PATENT DOCUMENTS

| | | | |
|---|---|---|---|
| 3,249,228 | 5/1966 | Arvanitakis | 55/DIG. 12 |
| 3,261,148 | 7/1966 | Wurtenberg | 55/484 |
| 3,400,519 | 9/1968 | Korn et al. | 55/484 |
| 3,524,304 | 8/1970 | Wittemeier et al. | 55/484 |
| 3,844,749 | 10/1974 | Carter, Sr. | 55/378 |
| 4,300,927 | 11/1981 | Day | 55/378 |
| 4,808,203 | 2/1989 | Sabourin | 55/500 |
| 4,854,953 | 8/1989 | Van Weerden et al. | 55/484 |
| 5,061,112 | 10/1991 | Monford, Jr. | 292/251.5 |
| 5,298,044 | 3/1994 | Sutton et al. | 55/DIG. 12 |
| B1 4,056,375 | 1/1987 | Ringel et al. | 55/381 |

FOREIGN PATENT DOCUMENTS 9408095  4/1994  WIPO .................................. 70/57.1

*Primary Examiner*—C. Scott Bushey
*Attorney, Agent, or Firm*—Pennie & Edmonds

[57] ABSTRACT

A filter element for the separation of dust particles from a gas flow or air flow. The filter element includes a number of filter pockets and a main support frame, the open mouth edges of the filter pockets being interconnected to the main support frame and its interconnecting traversing ribs. This design of the filter element results in a substantial increase in the usage values of the materials involved and favorably contributes to present high environmental standards, at lower long term system costs. This is achieved by using a main support frame which includes interfitting subframes that are detachably connected one to another and to the filter pockets.

15 Claims, 2 Drawing Sheets

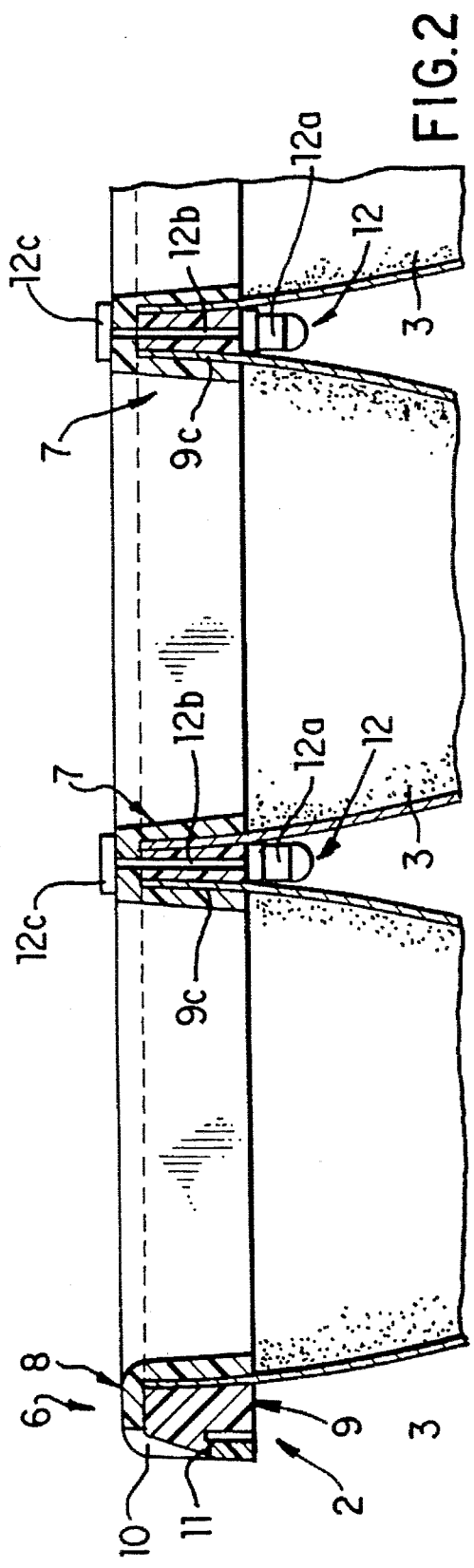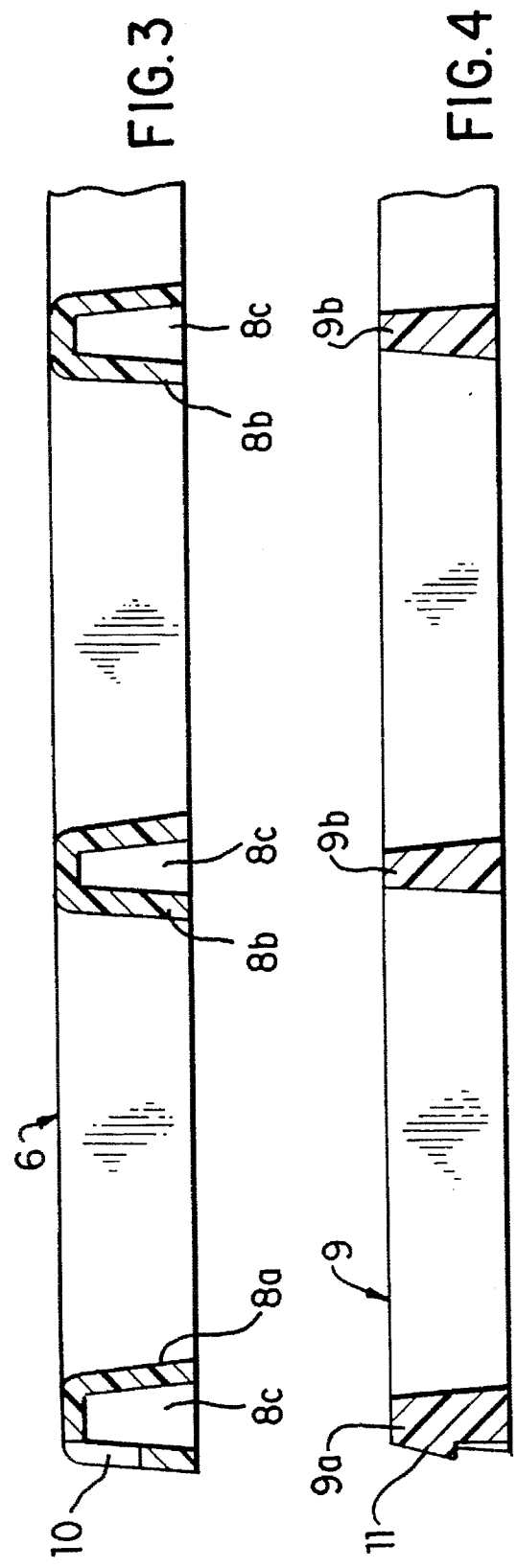

FILTER ELEMENT

BACKGROUND OF THE INVENTION

The invention relates to a filter element for the separation of dust particles from a gas flow or air flow. The filter element comprises a number of filter pockets and a main support frame, the open mouth edges of the filter pockets being interconnected to the main support frame and its interconnecting traversing ribs.

Such a filter element typically forms part of a large filtration system which is provided with a number of filter elements for use in, for example, air supply installations for ventilating applications in commercial buildings, plants, industrial installations, and painting booths. One such gas filter element is described in U.S. Pat. No. 4,056,375. In this prior art a number of self-supporting, relatively stiff filter pockets are undetachably connected to a main support frame since these filter pockets are immediately and materially integrated with the edges of the non-woven filter pockets by means of a foaming method.

After utilization, when the filter pockets are saturated with dust particles and have to be replaced, it is a great disadvantage that the main support frame is not reusable and must be destroyed. Not only do the filter pockets have to be replaced, but due to the inherent design of the filter pockets, the integrated main support frames have to be replaced as well. This is environmentally unsatisfactory, because the material of the filter pockets cannot simultaneously be recycled with the material of the main support frame. Moreover, heavily contaminated filter pockets may be considered as falling under chemical refuse for which recycling will not be applicable and for which special regulations for disposition are employed.

Other known filtration systems do not allow for an efficient separation of the raw material, either mechanically or chemically, in such integrated filter pockets from the main support frame so that the reuse of materials by a recycling process is not feasible or practicable.

Another disadvantage of the prior art is related to the voluminous space required for storage and transport respectively because the inflexible shape of the filter element. Particularly, the imbedding of the filter pockets in its main support frame, does not allow for a reduction in volume merely by pressing the sides of adjacent filter pockets together. At the most it will be possible to shelve two filter elements in the prior art, identical in sizes, into each other reversely by making use of the wedged spaces of adjacent stiff filter pockets. Transport and storage costs in such an arrangement are not unduly affected.

SUMMARY OF THE INVENTION

This invention provides for a novel filter element which does not have the aforementioned disadvantages thereby enabling a substantial increase in the usage values of the materials involved and favorably contributing to present high environmental standards, at lower long term system costs. This is achieved, inter alia, by using a main support frame which comprises interfitting subframes which are detachably connected one to another and to the filter pockets. The filter element according to this invention has the following advantages:

(1) The same main support frame is now reusable many times;

(2) Fewer main support frames need to be mechanically/chemically treated and made fit for recycling, which reduces the environmental burden;

(3) Storage and transport expenses are decreased because of the need for less storage, transport, and packing space, which then allows for a substantial larger number of pre-fabricated filter pockets and frames to be loaded on to, for example, a large seafreight or airfreight container or truck. Practically, this means that almost 4 times as many pre-fabricated novel filter elements can be stored in the same volume space, compared with the prior art filter elements.

In a preferred embodiment of the present invention, the periphery of the interior subframe to which the filter pockets are connected, comprises a number of protrusions, and the periphery of the exterior subframe is provided with a corresponding number of receiving openings. While interfitting the subframes into the main support frame, the protrusions are interlockingly engaged by each of the receiving openings, preferably by means of a snapping action, and simultaneously, the open edges of the filter pockets are leak-free and tightly wedged in the narrow slit left between the opposed surfaces of the subframes.

This way of interlocking engagement between the subframes and the edges of the filter pockets guarantees during operating time a totally reliable leak-free seal. This seal is additionally improved in another embodiment of the invention when the main support frame is additionally and preferably provided in the traversing ribs with security locks. Under operation these locks provide optimal effect against heavy air or equivalent thrust loads. It has been found that a security lock operating under a magnetic force is a highly preferred embodiment.

An efficient method for the assembly of the invented filter element is characterized by the following steps: (1) In a first operational step the filter pockets are positioned upon a workbench provided with recesses for accommodating the filter pockets with their open edges fixed to the interior subframe. (2) In a second operational step the exterior subframe is positioned over the interior subframe and forcibly pressed down to interlock the protrusions of the interior subframe with the receiving openings of the exterior subframe in such a way that these frame portions are interconnected firmly and flatly thereby tightly interwedging the filter pockets leak-free in the assembled main support frame. (3) A third operational step provides the traversing ribs of the main support frame with a number of security locks in such a way that undesired and/or unauthorized loosening of the interassembled subframes and the filter pockets is thereby prevented.

Another efficient method for disassembling an invented filter element to replace the filter pockets is characterized by the following steps: (1) In a first operational step the security locks are unlocked by placing the filter element upon a workbench, which is preferably provided with a number of built-in magnets at the location of a security pin lock to disengage the locked pins. (2) Either in the previous operational step or during this operational step one or more wedge shaped knife tools are forcibly interposed in the narrow slit left between adjacent subframe parts at both sides of a protrusion where the latter is interlockingly engaged and held by a receiving opening, causing the protrusion to be released from the receiving opening. Thereafter the pocket filters can easily be removed from the disengaged interior subframe from which the exterior subframe can now be lifted away.

Certain characteristics and other advantages of the invention may be more apparent when this invention is explained further with reference to the accompanying drawings.

BRIEF DESCRIPTION OF THE DRAWINGS

FIG. 2 is a partial cross section through the main support frame along the line A—A of the filter element in FIG. 1;

FIG. 3 is a partial cross section through the exterior subframe along the line B—B in FIG. 1; and FIG. 4 is a partial cross section through the interior subframe along the line B—B in FIG. 1.

DESCRIPTION OF THE PREFERRED EMBODIMENT

Figure 1:
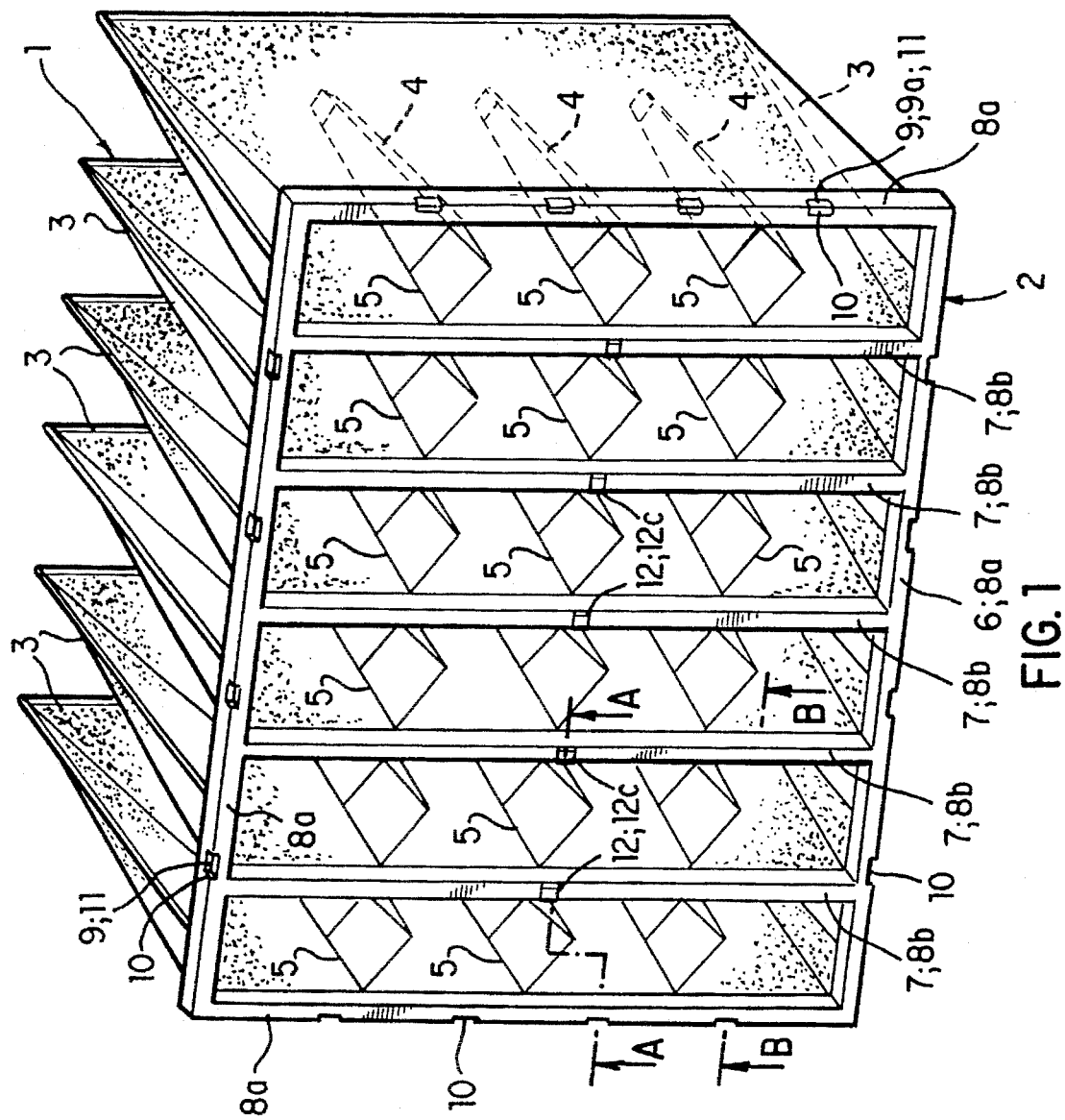
FIG. 1 is a front view, partly in perspective, of a filter element according to the invention.

The filter element 1 comprises a main stiff support frame 2 and wedge shaped filter pockets 3. These filter pockets 3 are preferably of the type having self supporting characteristics which are realized by, amongst others, the application of stiffened cloth materials, such as specially prepared non-woven filter materials, in addition to appropriate distance means 5, also of non-woven material, positioned along the depth of the filter pocket. The distance means 5 are welded because in each filter pocket 3 at both its sides along lines 4 and because of their diamond shape their opposite flanks tend to flatten horizontally under load pressure thereby exerting a stabilizing force upon the operating vertical position of the filter pocket and thus avoiding blowing up of the filter pocket. These distance means 5 tend to fold up vertically (in FIG. 1) in the event loose filter pockets are piled up for storage.

The wedge shaped filter pockets 3 are generally manufactured from non-woven filter sheet material consisting of glass fibers or synthetic fibers. The absorption rate for dust particles and the rate of retention are very favorable in such materials.

The main support frame 2 comprises the frame 6 itself and traversing bars or ribs 7. The main support frame 2 (also see FIG. 2) is built of an exterior subframe 8 that snugly fits over an interior subframe 9. In order to achieve a low flow resistance in the air stream wherein it is installed and also to provide for an increased density, automatic, leak-free seal in the compressed edges of the non-woven filter pocket mouth material, it is favorable to give the combination of the subframe 8, the frame portion 8a and the traversing bars 8b, in a cross section, a trapezoidal shape, leaving the base 8c open (also see FIG. 3). In a cross section the frame portion 9a and the traversing bars 9b of the subframe 9 also have a trapezoidal shape, and there are provided pin holes 9c (see FIG. 2) for the leak-free insertion of security means 12. In a preferred embodiment there are provided on the periphery of the interior subframe 9 upon which the edges at the mouth of the filter pocket are applied, and at the circumference of the frame portion 9a thereof, a number of protrusions 11 which can be locked by a snapping movement into corresponding receiving openings 10 which are provided in the periphery of the exterior subframe 8. As a result both subframes 8 and 9 can be interconnected while exerting pressure for assembling and the rigid connection so obtained, results in a firm, smooth and rigidly flat assembly of this main support frame 2.

The filter pockets 3 having self supporting characteristics, are each applied to the interior subframe 9 by means of the edge of their open ended mouth, i.e., around the traversing bars or ribs 9b and are loosely fitted to the frame portion 9a. The exterior subframe 8 is placed over the interior subframe 9 to which the filter pockets 3 are loosely fitted. In a favorable embodiment, except for the interconnection by means of the interlocking structure of protrusions 11 and receiving openings 10 provided on the subframes 8 and 9 respectively, the subframe 9 and the filter pockets 3 are securely interconnected in a leak-free manner by security means 12. After assembly a leak-free and reliable filter element is obtained.

In a preferred embodiment the security means consists of so-called magnetically operated security pins, known in the art for anti-theft devices of textile consumer goods. These are generally composed of a resin head piece 12a internally provided with elements to magnetically lock a (steel) pin 12b, that is protruded through the material to be secured and locked, this pin being provided with a flat head piece 12c. The pin can only be magnetically unlocked, thus releasing both the filter pockets from the jointly assembled exterior and interior subframes 8 and 9 respectively and the filter pocket edges from the traversing ribs, and this enables easy replacement of the pocket filter cloth inserts. Preferably, rigid main support frame 2 composed of both subframes 8 and 9, is manufactured from a polyamide which is extremely durable, rigid, and can be granulated and re-utilized by means of a recycling process, since it is impact-resistant, thermo-chemically stable, and has a fracture-free surface. It can be easily injection molded, and in addition, does not contain substances which are environmentally undesirable.

To facilitate an efficient way of assembling and disassembling after the lifetime of the inserted pocket filter element has expired, it is proposed to make use of a workbench. Preferably, such a workbench should be provided with supporting means for the interior subframe 9 and should be provided with recesses for the filter pockets in order to position the edges of the filter pockets upon the relevant subframe portions, and it should also contain supporting means for the traversing ribs. For interlocking the subframes, one upon another, whereby the edges of the filter pockets are inter-engaged by opposite subframe wall portions, pressure means may also be provided on the workbench to force the leak-free, compressed, and wedged material into a leak-free air seal. To disassemble the filter element for replacement of the filter pockets, it is preferable to use a tool frame which is provided with special magnets at the location of each security pin to unlock all of them simultaneously. The interlocking engagement between the subframes could be easily unlocked while using a row of upstanding wedge shaped V-shaped tools which can penetrate in the narrow slit at both sides of the protrusion in the frame assembly. After a slight penetration of the tool, which will cause the protrusion 11 to become unlocked from its corresponding receiving opening 10, the exterior subframe 8 can be easily lifted from the interior subframe 9 to replace the pocket filter insert.

The invention provides for a very rigid main frame structure and the single subframes 8 and 9 respectively are in themselves rather flexible, and as a result the filter element meets very high requirements for rigidity, reliability, and flow stability. Besides, the main frame structure can be used at least 10 times or more compared with prior art filter elements, thereby resulting in substantial service cost reduction with respect to usage, storage, and transportation.

For one of ordinary skill in the filter element art described here, it is clear that several constructional features may be amended without deviating from the full potential scope of this invention.

We claim:

1. A filter element for the separation of dust particles from a gas or air flow, comprising:

a number of filter pockets; and a main support frame;

the open mouth edges of said filter pockets being interconnected to said main support frame and its interconnecting traversing ribs wherein said main support frame comprises interfitting interior and exterior subframes which are detachably connected one to another and to each and all of said filter pockets, characterized in that the periphery of the interior subframe to which said filter pockets are connected, comprises a number of protrusions and the exterior subframe is provided with a corresponding number of receiving openings for interfitting said subframes into said main support frame, the protrusions being interlockingly engaged by each of said receiving openings by means of a snapping action, such that simultaneously the open edges of said filter pockets are leak free and tightly wedged between opposed surfaces of said subframes.

2. A filter element according to claim 1, wherein in a cross section said traversing ribs and the frame of said interior subframe are of trapezoidal shape and the traversing ribs of said interior subframe are provided with holes for the insertion of a security means.

3. A filter element according to claim 1, wherein in a cross section said traversing ribs and the frame of said exterior subframe are of reversed trapezoidal shape, its longest base being open.

4. A filter element according to claim 1, such that, in cross section, said traversing ribs of said interior and exterior subframes are smaller than said frame of said interior and exterior subframes in cross section.

5. A filter element according to claim 2, such that, in cross section, said traversing ribs of said interior subframe are smaller than said frame of said interior subframe in cross section.

6. A filter element according to claim 3, such that, in cross section, said traversing ribs of said exterior subframe are smaller than said frame of said exterior subframe in cross section.

7. A filter element according to claim 1, wherein said main support frame has been molded from a granular resin which is of a recyclable type.

8. A filter element according to claim 2, wherein said main support frame has been molded from a granular resin which is of a recyclable type.

9. A filter element according to claims 3, wherein said main support frame has been molded from a granular resin which is of a recyclable type.

10. A filter element according to claim 1, such that said main support frame is provided with a number of security locks which are at least provided in each of said traversing ribs.

11. A filter element according to claim 2, such that said main support frame is provided with a number of security locks which are at least provided in each of said traversing ribs.

12. A filter element according to claim 3, such that said main support frame is provided with a number of security locks which are at least provided in each of said traversing ribs.

13. A filter element according to claim 10, such that said lock comprises a magnetically operating security lock pin.

14. A filter element according to claim 1, wherein the plurality of subframes forming part of the main support frame comprises:

an interior subframe with traversing ribs such that in a cross section said traversing ribs and the frame of said interior subframe are of trapezoidal shape and the traversing ribs of the interior subframe are provided with holes for the insertion of a security means and an exterior subframe with traversing ribs such that in a cross section said traversing ribs and the frame of said exterior subframe are of reversed trapezoidal shape, its longest base being open.

15. A filter element for the separation of dust particles from a gas or air flow, comprising:

a number of filter pockets; and a main support frame;

the open mouth edges of said filter pockets being interconnected to said main support frame and its interconnecting traversing ribs wherein said main support frame comprises interfitting interior and exterior subframes which are detachably connected one to another and to each and all of said filter pockets, characterized in that the periphery of the exterior subframe to which said filter pockets are connected, comprises a number of protrusions and the interior subframe is provided with a corresponding number of receiving openings for interfitting said subframes into said main support frame, the protrusions being interlockingly engaged by each of said receiving openings by means of a snapping action, such that simultaneously the open edges of said filter pockets are leak free and tightly wedged between opposed surfaces of said subframes.

* * * * *